HERMANN SCHMID
INVENTOR
BY Richard G. Stephens
ATTORNEY

HYBRID INTEGRATOR CIRCUIT

Filed March 3, 1961 3 Sheets-Sheet 2

HERMANN SCHMID
INVENTOR

BY Richard G. Stephens
ATTORNEY

HERMANN SCHMID
INVENTOR

BY Richard G. Stephens
ATTORNEY

United States Patent Office 3,152,249
Patented Oct. 6, 1964

3,152,249
HYBRID INTEGRATOR CIRCUIT

Hermann Schmid, Binghamton, N.Y., assignor to Link Division of General Precision, Inc., Binghamton, N.Y., a corporation of Delaware Filed Mar. 3, 1961, Ser. No. 93,220
5 Claims. (Cl. 235—183)

This invention relates to electronic computers, and more particularly, to an improved hybrid integrator circuit. Contemporary analog computer integrators are limited in accuracy and dynamic range due to drift in their D.C. amplifiers, and contemporary digital integrators are frequently regarded as too slow. By combining analog and digital techniques, provision of an integrator circuit is made possible, according to the present invention, with practically no accuracy or dynamic range limitations, with the device still operating at relatively high speeds and still maintaining the continuous representation, or infinite resolution, of the analog system. Such an integrator accepts a hybrid input signal and provides a hybrid output signal. In a hybrid computing system, the most significant part of a variable is represented by a digital signal and the least significant part by an analog signal.

A prior version of an analog-digital (hybrid) integrator was suggested by H. K. Skramstad of the National Bureau of Standards in the 1959 Proceedings of the Eastern Joint Computer Conference. The hybrid integrator of the present invention employs a similar method of splitting the integral $$\frac{1}{T}\int (X_D+X_A)\,dt$$

into the sum of several integrals, but the circuitry of the present invention is considerably simpler, and the performance considerably better than that of all known prior art hybrid integrators.

Thus it is a principal object of the present invention to provide an improved hybrid integrator which is simpler, more economical and more reliable.

It is another object of the invention to provide a hybrid integrator utilizing parallel binary input and output signals so that registers needed for serial digital quantities may be omitted.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

If the independent variable X, which is represented by a digital value $X_D$ and by an analog value $X_A$, is integrated with respect to time, the integral becomes $$Y=\frac{1}{T}\int_0^t X\,dt=\frac{1}{T}\int_0^t (X_D+X_A)\,dt=\frac{1}{T}\int_0^t X_D\,dt+\frac{1}{T}\int_0^t X_A\,dt \qquad (1)$$

Further, if the time is divided into equal intervals of duration $\Delta t$, and if the digital quantity is permitted to change its value only at the beginning of $\Delta t$, then the integral may be expressed as $$Y=\frac{1}{T}\int_0^t X\,dt$$
$$=\frac{1}{T}\left\{\sum_{i=1}^{n-1} X_{Di}\Delta t+X_{Dn}[t-(n-1)\Delta t]+\int_0^t X_A\,dt\right\} \qquad (2)$$

where $X_{Di}$ is the value of $X_D$ at the i-th interval of $\Delta t$, and $X_{Dn}$ in value at the n-th interval.

Figure 1:
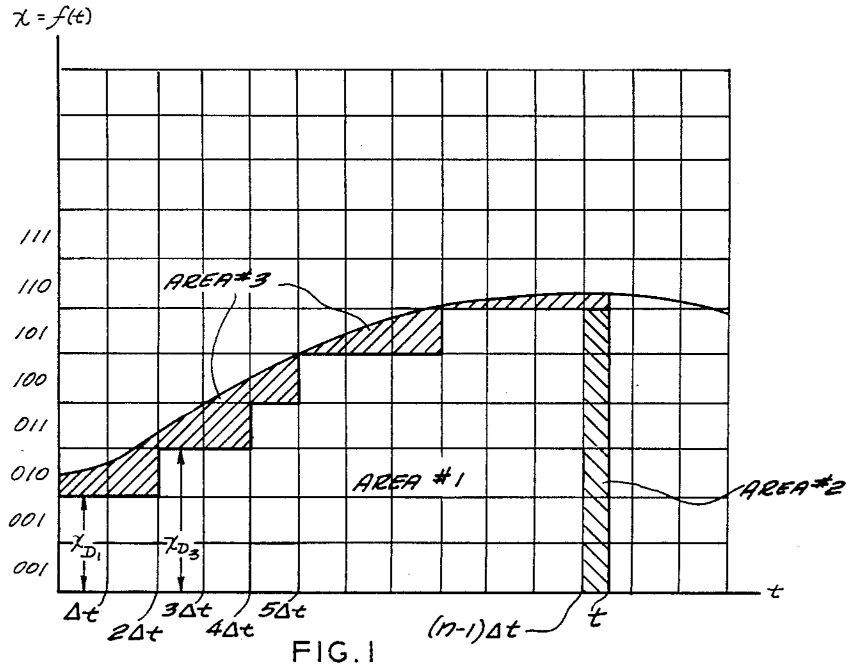
FIG. 1 is a graph of a time-varying independent variable X shown plotted against time, useful in understanding operation of the invention.

In FIG. 1 the integral is represented as the area under the curve $X(t)$ from the time $t=0$ to an arbitrary $t$. In the graph and in the equations above it has been assumed that the initial value of Y is zero. The three terms within the brackets of Equation 2 correspond to the three areas depicted in FIG. 1. Area #1 is the integral of the digital part of X between $t=0$ and $t=(n-1)\Delta t$; area #2 is the integral of $X_D$ between $(n-1)\Delta t$ and $t$; area #3 is the integral of the analog part of X between $t=0$ and $t$.

Figure 2:
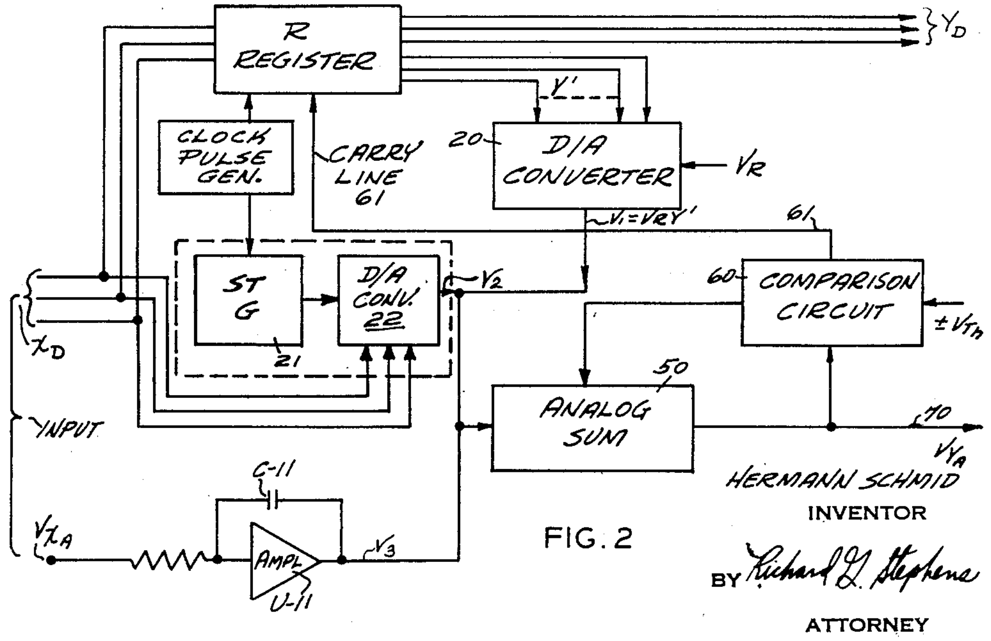
FIG. 2 is an electrical schematic, partially in block diagram form, showing an exemplary embodiment of the present invention.
Figure 5:
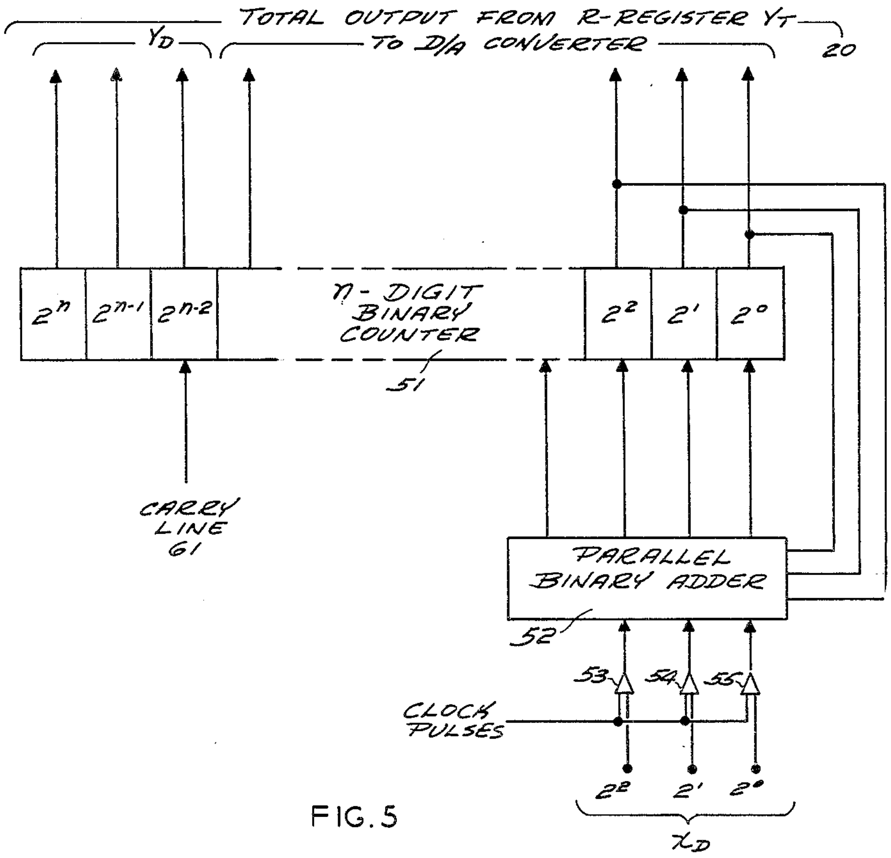
FIG. 5 is a schematic diagram of an exemplary form of accumulator which may be used as the R register of the device of FIG. 2.

The present invention comprises three major portions, each one of which produces one of the terms of the right hand side of Equation 2. Referring to FIG. 2, it will be seen that the binary digital input signal $X_D$ is added into the R register or accumulator (having $n$ stages) at the beginning of each $\Delta t$ time period, to provide an $n$-digit binary number, $n$ being a function of the dynamic range desired. The number of digits desired for the system digital signals may be designated by $k$. Of the $n$ output digits of the R register, $k$ is used to represent the digital output of the system, while $n$–$k$, the remaining digits, are converted into an analog voltage $V_1$, which will be understood to represent a portion of area #1 in FIG. 1. The function of the R register is to accept the $X_D$ digital input signal commensurate with the most significant portion of the independent input variable, and to add the value of $X_D$ to the number previously stored in the register. In FIG. 5 the R register is shown as comprising a conventional parallel-binary adder 52 and a $n$-digit binary counter 51. The parallel adder 52, which may comprise any one of numerous known types, operates to sum the $X_D$ input signal with the lowest order digits then in counter 51, so that the presence of a digital input each time a clock pulse occurs will result in counter 51 being advanced. Because the digital input lines are gated through conventional AND gates 53, 54, 55 together with clock pulses from the clock pulse source, the register output changes only at the beginning of each $\Delta t$ time period. As mentioned above, $k$ of the R register output digits comprise the hybrid integrator output signal $Y_D$, and the remaining ($n$–$k$) least significant digits are routed to digital-to-analog converter 20 to be converted back to analog form. Because the digital $X_D$ input to the present invention is in parallel binary form rather than a pulse rate, no separate input register is required as in prior systems. Digital-to-analog converter 20 conveniently may take the form shown in FIG. 3, with the least significant digits of the R register output being applied via lines 31, 32, 33 and a constant reference voltage $V_R$ being applied via terminal 38 across the collector circuits of the transistor switches of the converter.

In FIG. 2 variable amplitude sawtooth generator circuit means including sawtooth generator 21 and digital-to-analog converter 22, provides a voltage $V_2$ which is proportional to both $X_D$ and to time $t$. For accurate operation this generator means must generate a sawtooth wave with constant period and an amplitude proportional to $X_D$, the digital signal input. Prior art hybrid integrators have used D/A converters and complicated resettable integrator circuits (comprising ordinary analog integrators and pulse switching circuits to discharge the integrating capacitors quickly). These circuits have been very complex and expensive compared to the present invention. I prefer to provide such a wave by supplying a sawtooth having constant period and constant amplitude to a digital-to-analog converter 22 of the nature shown in FIG. 3.

Figure 3:
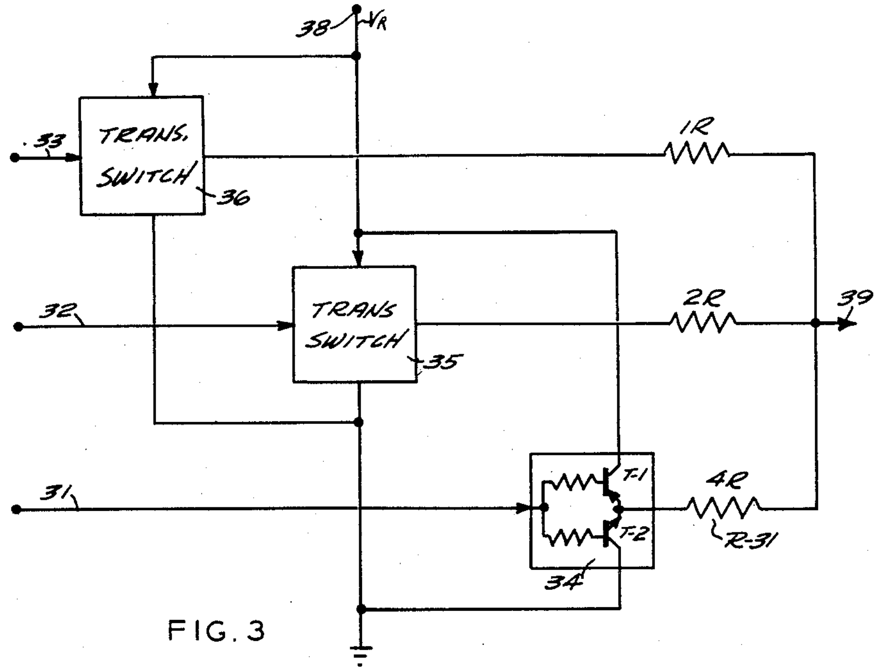
FIG. 3 is an electrical schematic diagram of an exemplary digital-to-analog converter circuit which may be used in connection with converters 20 and 22 of FIG. 2.

A reference sawtooth wave of constant period and amplitude is generated in the present invention by completely conventional constant amplitude sawtooth generator 21, which may comprise any one of numerous simple known sawtooth generators, such as those commonly used as oscilloscope sweep generators, for example, and then the wave is applied to D/A converter 22, which may comprise a plurality of complementary transistor switches and associated scaling resistors connected as shown in FIG. 3. The period of the sawtooth wave is made to correspond to the clock pulse period, and the clock pulse source is connected to synchronize the sawtooth generator. D/A converter 22 accurately attenuates the reference sawtooth wave to an amplitude directly proportional to $X_D$, the digital input signal commensurate with the most significant portion of the input variable. Converter 22, for a three-digit $X_D$ binary input signal, requires only three complementary transistor voltage switches (six transistors) and three binary-weighted precision scaling resistors. Converter 22 receives its three-digit binary input on lines 31, 32 and 33 which feed three identical complementary switches 34, 35 and 36, respectively. Switch 34, shown in detail, comprises two transistors T–1 and T–2 of opposite conductivity types, whose emitters are interconnected to provide an output which is applied through scaling resistor R–31 to output line 39. The constant amplitude sawtooth potential generated by generator 20 is applied across the collector circuits of each of the transistor switches. When any input digit is "1" or "high," energization of the base electrodes of its associated transistor switch serves to provide an accurate replica of the sawtooth voltage at the switch common emitter terminal. Since the various switches apply the sawtooth wave through precision binary-weighted scaling resistors, the output voltage $V_2$ at summing junction 39 is a sawtooth voltage accurately attenuated to an amplitude proportional to $X_D$, the digital portion of the input variable. Converter 22 requires $n$ stages. The output voltage $V_2$ from variable amplitude sawtooth generator circuit means 20 is commensurate with area #2 of FIG. 1.

The analog input signal $X_A$ of the input variable X is integrated by a conventional analog computer integrating circuit comprising conventional analog computer operational amplifier U–11 and feedback capacitor C–11. In some embodiments of the invention, simple RC integrating circuits will be regarded as sufficiently accurate, especially if additional binary digits are used to specify the digital portion of the signals.

The three voltages $V_1$, $V_2$ and $V_3$ representing the three terms of Equation 2 are summed by means of summing circuit 50 to provide the analog output voltage $V_{YA}$ portion of the output signal at terminal 70. This output signal also is compared with upper and lower threshold reference voltages, $+V_{th}$ and $-V_{th}$, each of which corresponds in magnitude to one bit or unit of the digital signal. Whenever $V_{YA}$ exceeds $+V_{th}$ comparison circuit 60 produces a carry signal on line 61 to add "1" to the contents of the R register, and conversely, whenever $V_{ya}$ goes below $-V_{th}$, the carry is subtracted from the R register.

Figure 4:
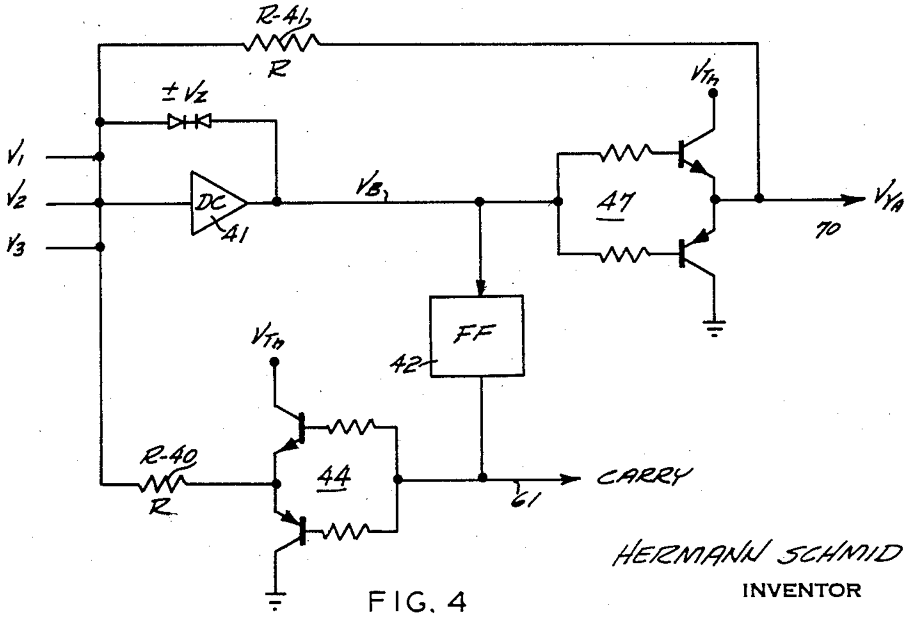
FIG. 4 is an electrical schematic diagram of a preferred form of summing and comparison circuit suitable to comprise blocks 50 and 60 of FIG. 2.

While the summing and comparison circuits have been shown in FIG. 2 as separate blocks 50 and 60 for convenience of explanation, in actual construction of the invention they may take the form illustrated in FIG. 4, which is a simplified form of the partial analog-to-digital converter disclosed in my copending application Serial No. 62,663, filed October 14, 1960, with provision for a single binary digit. The circuit advantageously uses an accurate bi-directional electronic limiter circuit shown in my copending application Serial No. 755,292, filed August 15, 1958, now abandoned, to which reference may be had for a detailed explanation. D.C. amplifier 41 and transistor switch 47 constitute such a limiter. Whenever the sum of the three inputs of D.C. amplifier 41 from elements 20, 22 and U–11 varies between the switch 47 collector voltages, zero and $-V_{th}$, the $V_{YA}$ output voltage faithfully follows the summed input, but with inverted sign. Whenever $V_{YA}$ exceeds these limits switch 47 saturates. Conventional flip-flop or trigger 42 is arranged to be "set" whenever $V_B$, the output voltage of D.C. amplifier 41, goes more negative to the $-V_{th}$ volts, thereby providing an output on line 43, and to "reset," removing the output from line 43 whenever the $V_B$ voltage goes more positive than ground. When switch 47 saturates, feedback through R–41 is interrupted, and $V_B$ assumes $+V_Z$ or $-V_Z$, the breakdown voltages of the zener diodes connected across amplifier 41. When flip-flop 42 "sets," it operates complementary transistor switch 44, which applies a precision $-V_{th}$ volt signal to amplifier 41 via scaling resistor R–40. The carry line 61 connects the carry signals to the appropriate stage of the R register. The output of the hybrid integrator consists, of course, of a digital most-significant part $Y_D$ from the R register, together with the analog least-significant part $V_{YA}$ provided at output terminal 70.

The static accuracy of the invention is limited only by cost or complexity allowable. Like most digital circuits, this invention may be made as accurate as desired by providing circuitry for more digits to represent the most significant part of the variable. In contrast to the usual digital integrator, however, the resolution of the present invention is theoretically infinite, due to representation of the least significant portion of the variables in analog form.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. An electronic integrator circuit for integrating with respect to time first and second input signals together representing an input independent variable to provide third and fourth output signals together representing the time integral of said variable, wherein said first and third signals are parallel binary digital signals and said second and fourth signals are analog signals, said circuit comprising in combination: a counter, means for periodically adding said first parallel binary signal to the number in said counter, thereby to provide said third signal; a first digital-to-analog converter connected to convert a group of least significant digits of the number in said counter into a first voltage; an electronic analog integrator operable to integrate said second input signal with respect to time to provide a second voltage; sawtooth generator means for generating a constant period constant amplitude linear sawtooth voltage having a period corresponding to the periodic addition of said first signal into said counter; a second digital-to-analog converter operable to attenuate said sawtooth voltage in accordance with the value of said first signal to provide a third voltage; and summing means for summing said first, second and third voltages to provide said fourth signal.

2. Apparatus according to claim 1 having carry-generating means responsive to said fourth signal for sensing excursion of said fourth signal outside predetermined limits for generating carry signals to modify the count in said counter and to control application of a reference voltage to said summing means.

3. Apparatus according to claim 1 in which at least one of said digital-to-analog converter circuits comprises a plurality of complementary transistor switches equal in number to the number of digits of the applied digital signal, each of said complementary transistor switches comprising a pair of mutually opposite conductivity type transistors having interconnected emitter terminals, the lines of the digital input signal to said converter circuit being connected to control the potentials of the base electrodes of said transistors.

4. Apparatus according to claim 1 in which said means for periodically adding said first signal to said counter comprises means for providing periodic clock pulses, and a plurality of coincidence gates each connected individually to a respective digit of said first signal and to said clock pulses, said clock pulses also being connected to synchronize said sawtooth generator means.

5. Apparatus according to claim 1 in which said electronic analog integrator comprises a high loop gain amplifier having a feedback capacitor.

References Cited in the file of this patent

UNITED STATES PATENTS

| | | |
|---|---|---|
| 2,841,328 | Steele et al. | July 1, 1958 |
| 2,950,052 | Knox | Aug. 23, 1960 |
| 3,119,928 | Skramstad | Jan. 28, 1964 |

OTHER REFERENCES

Skramstad, H. D., "A Combined Analog-Digital Differential Analyzer," Proc. Eastern Joint Computer Conference, No. 16, Dec. 1–3, 1959, pp. 94 to 100 (copies in Div. 68 and S.L.).